UNITED STATES PATENT OFFICE.

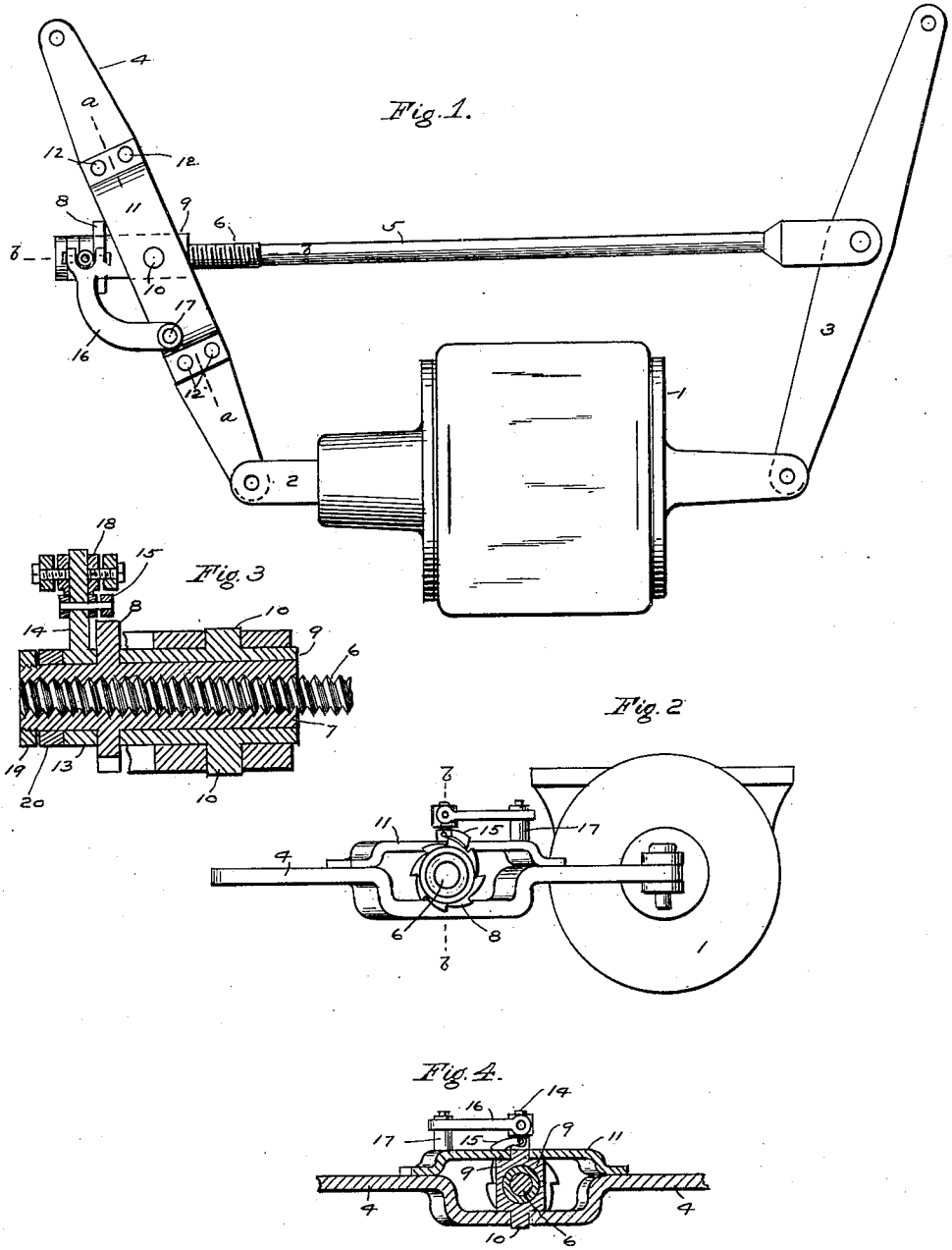

FRANCIS L. CLARK, OF PITTSBURG, PENNSYLVANIA, ASSIGNOR TO THE AMERICAN BRAKE COMPANY, OF EAST ST. LOUIS, ILLINOIS, A CORPORATION OF ILLINOIS.

SLACK-ADJUSTER.

No. 896,972.      Specification of Letters Patent.      Patented Aug. 25, 1908.

Application filed January 2, 1906. Serial No. 294,156.

*To all whom it may concern:*

Be it known that I, FRANCIS L. CLARK, a citizen of the United States, residing in Pittsburg, in the county of Allegheny and State of Pennsylvania, have invented certain new and useful Improvements in Slack-Adjusters, of which the following is a specification.

My invention relates to improvements in slack adjusters for railway car brakes. Its object is to provide means for adjusting the slack in the brake mechanism between the motor device of the brakes and the brake shoes; and it consists in new and improved means whereby the slack may be adjusted automatically by the operation of the brake motor device.

In the embodiment of my invention shown in the accompanying drawing, the motor device illustrated is actuated by fluid pressure; that is, it comprises a brake cylinder and piston of ordinary type; but other forms of motor may be employed; for example, an electrically operated device.

As shown in the drawing, Figure 1 is a plan view of a brake cylinder, cylinder levers, and connecting rod, with my improvement applied thereto; Fig. 2 is an end elevation of the devices shown in Fig. 1; Fig. 3 is a vertical section, on a larger scale, in the plane of the line *b—b* of Figs. 1 and 2; and Fig. 4 is a vertical section in the plane of the line *a—a* of Fig. 1, as seen when looking towards the left.

In Fig. 1 of the drawings, the brake cylinder 1, piston rod 2, and cylinder lever 3, are arranged as in the ordinary Westinghouse fluid pressure brake system; but the cylinder lever 4, and connecting rod 5, are adjustably connected together by means adapted to be operated by the movement of cylinder lever 4, to effect a shortening of the connecting rod 5, when excessive movement of the piston rod 2 occurs on account of an increase of slack in the brake rigging due to wear, stretching, bending, or any other cause. At one end, the connecting rod 5 is provided with a screw thread 6, to which is fitted an elongated nut 7, carrying a circular ratchet, or ratchet wheel, 8, which is preferably formed integral therewith. The nut 7 is cylindrical on its outer surface, and is fitted to turn in a block 9, which is pivotally connected to the lever 4 by means of the journals 10. The block 9 is fitted between the bent portion of the lever 4 and the piece 11, which is removably secured to the lever by the bolts 12. Next to the ratchet wheel 8, and bearing on the nut 7, is placed a collar 13, provided with an arm 14, to which is pivoted the pawl 15, so placed that it bears on and engages the teeth of the ratchet 8. A nut 19 on the end of the nut 7 holds the washer 20 and the collar 13 in place. An arm, or link, 16, is pivotally connected at one end to the lever 4, and at the other end to the arm 14, as shown in Fig. 3. The connection of the arm, or link, 16, with the lever 4 is by means of a stud 17 on the piece 11, and its connection with the arm 14 is by means of the loose collar 18, to which the bifurcated end of the link 16 is secured.

In the operation of the brakes, when the movement of the piston rod is excessive, on account of excess of slack, the accompanying excessive movement of the lever 4, relative to the pivots 10, and the consequent excessive movement of the link 16, will turn the arm 14 on the nut 7, and cause the pawl 15 to move into engagement with another tooth of the ratchet in advance of that on which it rested; and when the piston rod 2 moves inward on its return stroke, in taking off the brakes, the pawl will act on the ratchet so as to turn the nut 7 on the screw-thread, and so advance the nut as to shorten the length of rod 5 between the two cylinder levers 3 and 4 and thereby take up the excess of slack.

Having now described my invention, what I claim as new, and desire to secure by Letters Patent, is:—

1. In a slack adjuster for brakes, the combination with a brake lever and connecting rod having a threaded portion, of a block pivotally mounted on said lever, a nut for the rod rotatably connected to the block and carrying a ratchet wheel, a collar and pawl rotatably mounted on said nut, and means operated by the angular movement of the lever for actuating the pawl.

2. In a slack adjuster for brakes, the combination with a brake lever and connecting rod having a threaded portion, of a block pivotally mounted on said lever, a nut for the rod rotatably connected to the block and carrying a ratchet wheel, a collar and pawl rotatably mounted on said nut, and an arm pivotally connected to the lever for oscillating the collar and pawl.

3. In a slack adjuster for brakes, the combination with a pair of cylinder levers and a connecting rod, of a nut threaded on said rod and rotatably mounted in a pivotal connection to one of the levers, a pawl and ratchet for the nut, and an arm pivotally connected to the lever for operating said pawl.

4. In a slack adjuster for brakes, the combination with a pair of cylinder levers and a connecting rod, of a nut threaded on said rod and rotatably mounted in a pivotal connection to one of the levers, and a pawl and ratchet mechanism operated by the angular movement of the lever.

In testimony whereof I have hereunto set my hand.

FRANCIS L. CLARK.

Witnesses:
   R. F. EMERY,
   J. B. MACDONALD.